US009696696B2

(12) United States Patent
Obrist et al.

(10) Patent No.: US 9,696,696 B2
(45) Date of Patent: Jul. 4, 2017

(54) SUBSTATION AUTOMATION SYSTEM WITH DYNAMIC MULTICAST FILTER

(71) Applicant: ABB Technology AG, Zürich (CH)

(72) Inventors: Michael Obrist, Untersiggenthal (CH); Wolfgang Wimmer, Rietheim (CH); Gunnar Hilpert, Küssaberg (DE)

(73) Assignee: ABB Schweiz AG, Baden (CH)

( * ) Notice: Subject to any disclaimer, the term of this patent is extended or adjusted under 35 U.S.C. 154(b) by 349 days.

(21) Appl. No.: 14/309,240

(22) Filed: Jun. 19, 2014

(65) Prior Publication Data

US 2014/0303784 A1 Oct. 9, 2014

Related U.S. Application Data

(63) Continuation of application No. PCT/EP2012/075632, filed on Dec. 14, 2012.

(30) Foreign Application Priority Data

Dec. 21, 2011 (EP) .................................. 11194735

(51) Int. Cl.
*G06F 15/16* (2006.01)
*G05B 13/02* (2006.01)
*H04L 12/46* (2006.01)

(52) U.S. Cl.
CPC ...... *G05B 13/0245* (2013.01); *H04L 12/4641* (2013.01)

(58) Field of Classification Search
CPC .......... H04L 69/18; H04L 29/06; H04L 29/10
USPC .......................... 709/201, 203, 230; 370/392
See application file for complete search history.

(56) References Cited

U.S. PATENT DOCUMENTS

2006/0248208 A1* 11/2006 Walbeck ................. H04L 29/06
709/230
2011/0116508 A1* 5/2011 Kirrmann ............. H04L 12/437
370/392

FOREIGN PATENT DOCUMENTS

EP 2 148 473 A1 1/2010
EP 2 383 940 A1 11/2011

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued on Jul. 3, 2014, by the International Bureau of WIPO in corresponding International Application No. PCT/EP2012/075632. (7 pages).

(Continued)

*Primary Examiner* — Wing F Chan
*Assistant Examiner* — Andrew Woo
(74) *Attorney, Agent, or Firm* — Taft Stettinius & Hollister LLP

(57) ABSTRACT

Exemplary embodiments provide substation automation systems for operating a high or medium voltage substation for an electric power transmission or distribution network. The substation automation system includes a multitude of secondary devices, which transmit and receive data from/to each other via multicast packets. The secondary devices include packet filters, which are adapted to be set up dynamically during the runtime of the substation automation system, in order to update the rules for forwarding multicast packets received from the station bus system to the application running on the secondary devices.

9 Claims, 4 Drawing Sheets

(56) References Cited

OTHER PUBLICATIONS

International Search Report (PCT/ISA/210) mailed on Jan. 21, 2013, by the European Patent Office as the International Searching Authority for International Application No. PCT/EP2012/075632.
European Search Report issued on Apr. 11, 2012.
Su Lin et al., "Scheme of Intelligent Substation Network Construction Process Level", Telecommunication for Electric Power System, Jul. 10, 2010, vol. 31, No. 213, pp. 10-13 and19, D5 XX201007005 (with English language transtlation, 7 pages).
Yi Yong-Hi et al., "Research of Network Transmission of Process Bus Based Upon IEC 61850", 2011 The International Conference on Advanced Power System Automation and Protection, 2011 IEEE, pp. 1578-1582.

\* cited by examiner

SUBSTATION AUTOMATION SYSTEM WITH DYNAMIC MULTICAST FILTER

RELATED APPLICATION(S)

This application claims priority under 35 U.S.C. §120 to International application PCT/EP2012/075632 filed on Dec. 14, 2012 and claiming priority to European application 11194735.4 filed in Europe on Dec. 21, 2011. The content of each prior application is hereby incorporated by reference in its entirety.

FIELD

The disclosure relates to the field of Substation Automation (SA) systems and in particular to SA systems for operating a high or medium voltage substation for an electric power transmission or distribution network.

BACKGROUND INFORMATION

Substations in high and medium-voltage power networks include primary devices such as electrical cables, lines, bus bars, switches, power transformers and instrument transformers, which can be arranged in switch yards and/or bays. These primary devices can be operated in an automated way via a Substation Automation (SA) system. The SA system includes microprocessor based, programmable secondary devices, so-called Intelligent Electronic Devices (IEDs) responsible for protection, control and monitoring of the primary devices. The IEDs can be assigned to one of three hierarchical levels, e.g., the station level, the bay or application level, and the process level being separated from the bay level by a process interface. The station level of the SA system includes an Operator Work Station (OWS) with a Human-Machine Interface (HMI) and a gateway to a Network Control Center (NCC). IEDs on the bay level, also termed bay units, in turn can be connected to each other and to the IEDs on the station level via an optical inter-bay or station bus.

IEDs on the process-level include for example can include application-specific (e.g., non-conventional) electronic sensors for voltage, current and gas density measurements, contact probes for sensing switch and transformer tap changer positions, or intelligent actuators for controlling switchgear like circuit breakers or disconnectors. Breaker-IEDs, if shielded against electromagnetic disturbances, can even be directly integrated into the switchgear or respective intelligent primary equipment. Such process-level IEDs can be connected to the bay units via a process bus, preferably optical, which can be considered as the process interface replacing the hard-wired process-interface that is known to connect the switchyard to the bay level equipment.

A communication standard for communication between the secondary devices of a substation has been introduced by the International Electrotechnical Committee (IEC) as part of the standard IEC 61850 entitled "communication networks and systems in substations". For non-time critical messages, the communication between the IEDs is handled via a Manufacturing Message Specification (MMS) application level protocol and a reduced Open Systems Interconnection (OSI) protocol stack with the Transmission Control Protocol (TCP) and the Internet Protocol (IP) in the transport and network layer, respectively, and Ethernet as physical media. On the other hand, time critical messages, so-called Generic Object Oriented Substation Events (GOOSE, part IEC 61850-8-1 of the standard) build directly on the Ethernet link layer of the communication stack. Very time-critical signals at the process level such as trip commands and measured analogue voltages or currents use a simplified variant of GOOSE known as Sampled Values (SV, part IEC 61850-9-2 of the standard) that also builds directly on the Ethernet link layer.

Thus, switched Ethernet systems can be used for process control systems, e.g., to interconnect the secondary devices, to avoid message collisions as well as to restrict the data flow of multicast messages from and to secondary devices with virtual local area networks (VLAN) and multicast address based filters. Ethernet multicast messages in switched Ethernet can be in principle sent to all output ports of a network interconnection device such as a switch and to all receivers, e.g., secondary devices, in a LAN or VLAN, if no special filters can be set up on a network interconnection devices or a secondary device. These filters can be based on VLAN configuration and multicast address filters, which can be statically configured in the switches, for example.

The IEC 61850 multicast messages can be periodically sent, and sampled value messages even with sampling rates of 4 kHz and above. This leads to a high load not only in the Ethernet network, but on the application devices, e.g., the secondary devices, as every received packet ties up capacities of the secondary device, for example processing time at a network stack connecting the secondary device to the Ethernet and at a processor or central processing unit and the according application running on the secondary device. A load restriction at the Ethernet and/or the application IED can be gained by the static VLAN and/or multicast filter configuration in the switch or network interconnection device to which the IED is connected, or by a static filter on the IED. A static filter can be setup during the IED startup.

SUMMARY

An exemplary industrial automation system for operating an industrial process is disclosed, the automation system comprising: a substation automation system for operating a high or medium voltage substation of an electric power transmission or distribution network; wherein the substation automation system includes: a bus system and a multitude of secondary devices, which secondary devices are adapted to at least one of send and receive multicast messages via the bus system and which secondary devices are adapted to operate primary devices of the process or substation; a packet filter adapted to select multicast messages, based on a rule of the packet filter, and to forward selected multicast messages from the bus system towards an application of a secondary device; and a rule adaptor for adapting, dynamically during runtime of the automation system and based on a state of the application, the rule of the packet filter.

An exemplary method of adapting rules in a packet filter of a secondary device of an industrial automation system is disclosed, the industrial automation system having a substation automation system for operating a high or medium voltage substation of an electric power transmission or distribution network, wherein the packet filter is adapted to select, based on a rule of the packet filter, a multicast packet received via a bus system of the automation system, and to forward the multicast packet towards an application running on the secondary device, comprising: determining, dynamically during the runtime of the automation system, a state of the application; determining, based on the current state of the application, which multicast packets are specified by the application; and adapting the rules of the packet filter based on the specified multicast packets.

A computer readable medium, comprising a computer program element, which, when it is executed on processors of a secondary device of an automation system, instructs the processors to carry out a method of adapting rules in a packet filter of a secondary device of an industrial automation system for operating an industrial process having a substation automation system for operating a high or medium voltage substation of an electric power transmission or distribution network, wherein the packet filter is adapted to select, based on a rule of the packet filter, a multicast packet received via a bus system of the automation system, and to forward the multicast packet towards an application running on the secondary device, the method comprising: determining, dynamically during the runtime of the automation system, a state of the application; determining, based on the current state of the application, which multicast packets are specified by the application; and adapting the rules of the packet filter based on the specified multicast packets.

BRIEF DESCRIPTION OF THE DRAWINGS

The subject matter of the disclosure will be explained in more detail in the following text with reference to preferred exemplary embodiments which can be illustrated in the attached drawings, in which.

The reference symbols used in the drawings, and their meanings, can be listed in summary form in the list of reference symbols. In principle, identical parts can be provided with the same reference symbols in the figures.

DETAILED DESCRIPTION

Figure 1:
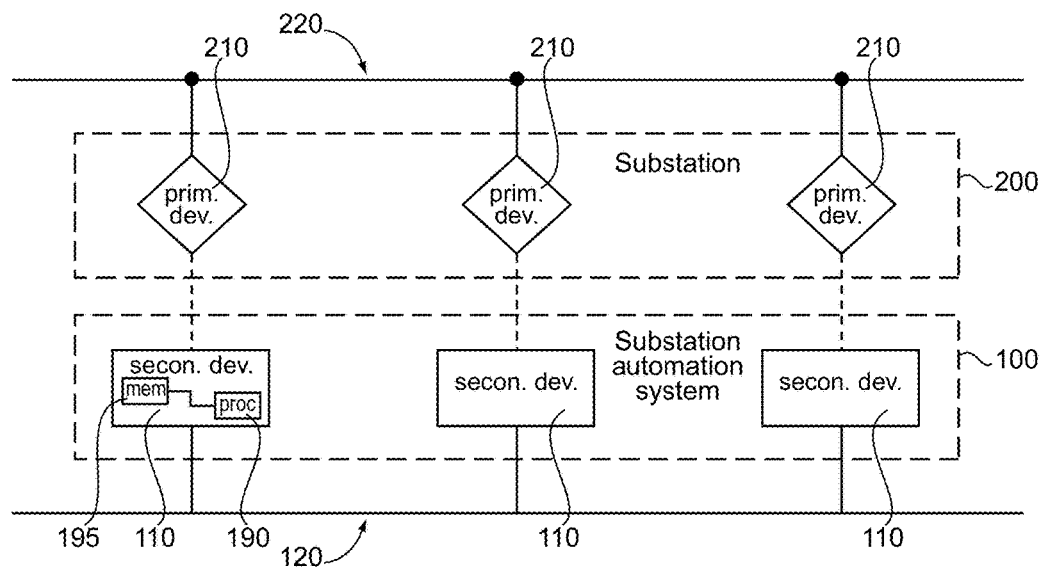
FIG. 1 schematically shows a power distribution network with a substation automation system according to an exemplary embodiment of the present disclosure.

Exemplary embodiments of the present disclosure provide an industrial automation system, such as a substation automation system and a method for setting up rules in a packet filter for filtering multicast packets in the system which reduces the processing load caused by multicast packets at the application running on a secondary device of the system.

According to an exemplary embodiment of the present disclosure, an industrial automation system for operating an industrial process, for example, a substation automation system for operating a high or medium voltage substation in an electric power transmission or distribution network includes a communication bus system and a multitude of secondary devices or I EDs, which secondary devices can be adapted to send and/or receive data via the bus system in a multicast mode and which secondary devices can be adapted for operating primary devices of the process or substation. The automation system includes a packet filter for filtering, based on a rule or parameter of the filter, data packets or messages transmitted via the bus system. The packet filter is adapted to select or identify, by applying a rule of the packet filter, multicast packets. The selected multicast packets can be forwarded from the bus system towards an application of a destination secondary device of the multitude of secondary devices. A rule adaptor is provided for adapting or updating the rule of the packet filter, dynamically during runtime of the automation system and following changes in a state of the application. The state of the application in turn depends on a current status of the process or substation, for example, on a dynamic substation topology as defined by the current status of all switching elements, or on actual excess power generation and/or consumption.

The packet filter can be configured to forward the multicast packet if the multicast packet meets a first rule of the packet filter. The packet filter can also be configured in such a way as to not forward, e.g., to reject or drop packets which meet a second rule of the packet filter. Thus, the packet filter can be configured according to a so-called white list (forward packets if and only if they meet a first rule of the packet filter) or a so-called black list (drop or reject packets if they meet a second rule of the packet filter). Whether a packet meets a rule of the packet filter is determined using a certain property of the packet such as a header field indicative of for example a source device, a destination device, a source application, a target application or a packet type. These properties can also be coded as numerals according to a certain assignment method, such as assigning an application or a packet type to a certain number.

Exemplary applications in substation automation include synchrocheck bus bar image and bus bar protection functionality. As a matter of fact, the adaptive filter can effectively reduce the number of incoming multicast packet streams from for example ten to the one specific packet stream that a synchrocheck application can specify given a present status or topology of the substation.

According to an exemplary embodiment of the disclosure, the rule adaptor is implemented in or hosted by the secondary device that is executing the application benefitting from the adapted rules of the packet filter; for example, the rule adaptor is part of the application itself. To this end, the state of the application is evaluated at the secondary device, based on the status of the process or substation as perceived by the application. Having each secondary device adapting its dedicated filter is advantageous over a single dedicated secondary device setting up rules of plural packet filters in the automation system in a centralized manner, for example in terms of processing power and communication delays.

According to another exemplary embodiment of the disclosure, each secondary device of the multitude of secondary devices includes a packet filter, wherein each packet filter is adapted to forward a multicast packet received via the bus system to an application of the respective secondary device if the multicast packet meets at least one rule of the packet filter. Packet filters residing at the secondary devices can be updated from a device internal rule adaptor within milliseconds. Contrary thereto, any filter residing at a switch or other network interconnection device would suffer from an additional time delay incurred by transmitting adapted filter parameter settings to the switch.

According to an exemplary embodiment of the present disclosure, the packet filter can be implemented at a hardware level of a protocol stack of a secondary device, the filter deciding at this hardware level if a message is to be forwarded to the higher stack layers and the application. For example, the packet filter can be implemented in hardware, e.g., hard-wired, or as an FPGA (field programmable gate array) in order to provide a fast and efficient filtering process. The packet filter can be located logically in a chip of the network stack or protocol stack of the secondary device, for example in an Ethernet chip adapted to accept and execute parameter changes on the fly, e.g., without interruption. A hardware level filter for suppressing multicast packets before they reach the layers of the protocol stack that can be executed on a central processing unit (CPU) of the secondary device allows the application to benefit from an undivided CPU processing capacity.

According to still another embodiment of the present disclosure, a multicast source is adapted to write a multicast identifier such as a VLAN (virtual local area network) ID, a multicast address (as in the switches on Ethernet level), an IEC 61850 APPID (16 bit word), or an AppId (character string) in a header field of the multicast packet, wherein the rule of the packet filter involves said identifier. Specifically, the identifier can be used to assign a multicast packet to a multicast stream and/or to identify such a multicast stream. The identifier can be written in an appropriate header field of each packet, and evaluated by the packet filter according to the adapted selection rules or filter criteria for forwarding or rejecting the multicast packet. The multicast identifiers of the multicast packets can be taken from a standardized configuration representation of the automation system, for example, from a Substation Configuration Description (SCD) of a substation automation system.

According to another exemplary embodiment of the present disclosure, a method for setting up rules in a packet filter for filtering multicast packets in an automation system having a secondary device, includes the steps: determining which multicast packets are currently needed (e.g., specified) by an application running on the secondary device; defining rules for the packet filter to forward a multicast packet received via a bus system to the application of the secondary device if the multicast packet meets at least one rule of the packet filter, updating the rules of the packet filter in case there is a change in the multicast packets needed by the application, wherein the method is carried out repeatedly during the runtime of the automation system.

As described above, the functional interrelation of the primary device or operation conditions of the substation automation system can change or vary in time, e.g., during a runtime of the substation automation system. In order to update the received multicast packets in accordance with the functional interrelation of the primary devices, the rules of the packet filters of the secondary devices can be updated dynamically during the runtime of the substation automation system so that the load of an application running on a processor of the secondary devices is restricted as the number of the received packets can be reduced.

According to a further aspect of the disclosure, a computer program element is provided, which, when it is executed on processors of a substation automation system, instructs the processors to carry out the method for setting up rules in a packet filter as described above and hereinafter. According to a further aspect of the disclosure, a computer readable medium including a computer program element as described above and hereinafter is provided.

It should be appreciated that depending on the computer system or substation automation system configuration and type, data storage components (computer readable media) can include volatile (such as RAM) and/or non-volatile (such as ROM, flash memory, etc.) components. Other data storage components that can be a part of the computer system include but can be not limited to CD-ROM, DVD or other optical storage, magnetic cassettes, magnetic tape, magnetic disk storage or other magnetic storage devices, or any other non-transitory medium which can be used to store the desired information and which can be accessed.

Multicast packets can be sent from several source device to a multitude or a receiver group of the other devices, e.g., secondary devices, in a network. The receiver group includes those of the secondary devices in a network which should receive the multicast packets. The multicast packets can represent status and control information from and for control and protection of primary devices, respectively.

The receiver group for the packets of a multicast stream, which includes all of the multicast packets of a given type, can include changing secondary devices, e.g., the secondary devices which should receive the packets of a multicast stream can change. The type of multicast packets can be defined by the source device and an appropriate primary device which the sent data pertain to.

The secondary devices controlling those of the primary devices which build up a functional interrelation can represent a receiver group for multicast packets. Thus, every secondary device of this receiver group receives all of the data from and to all of the secondary devices controlling these functional interrelated primary devices in order to track the status of these primary devices. Operations performed on one of the primary devices can depend on the status of other primary devices and therefore the respective secondary devices should be up to date with the status of all of the primary devices in the functional interrelated group of primary devices.

Thus, when a functional interrelation of the primary devices changes, the assigned secondary devices should not receive the status information of a non-functional interrelated primary device and the multicast packets representing the status information and control commands from and for a non-functional interrelated primary device may not be specified further by the secondary devices. When still being received, these multicast packets cause unnecessary load at the receiving secondary devices.

FIG. 1 schematically shows a power distribution network with a substation automation system according to an exemplary embodiment of the present disclosure. FIG. 1 shows a power distribution network with a substation 200 and a substation automation system 100, the substation 200 having three primary devices 210 and the substation automation system 100 having three secondary devices 110, wherein each secondary device 110 is assigned to a primary device 210.

The primary devices can be connected to a bus bar 220 and the secondary devices can be interconnected with a station bus system 120 for transmitting and receiving data to and from other secondary devices.

The secondary devices can be intelligent electronic devices (IEDs), adapted to control the primary devices, whereas each secondary device includes a processor 190 and a main or central memory 195 to store a computer program element.

The processor 190 is adapted to have an application run, which application is adapted to carry out control and monitoring processes of the respective primary device.

The secondary devices can be adapted to transmit and receive data with multicast packets via the station bus system 120 to each other. In order to restrict the load of an application running on a secondary device, each secondary device includes a packet filter which packet filter is configured to forward only those multicast packets to the application of a secondary device, which can be specified by this application.

Figure 2:
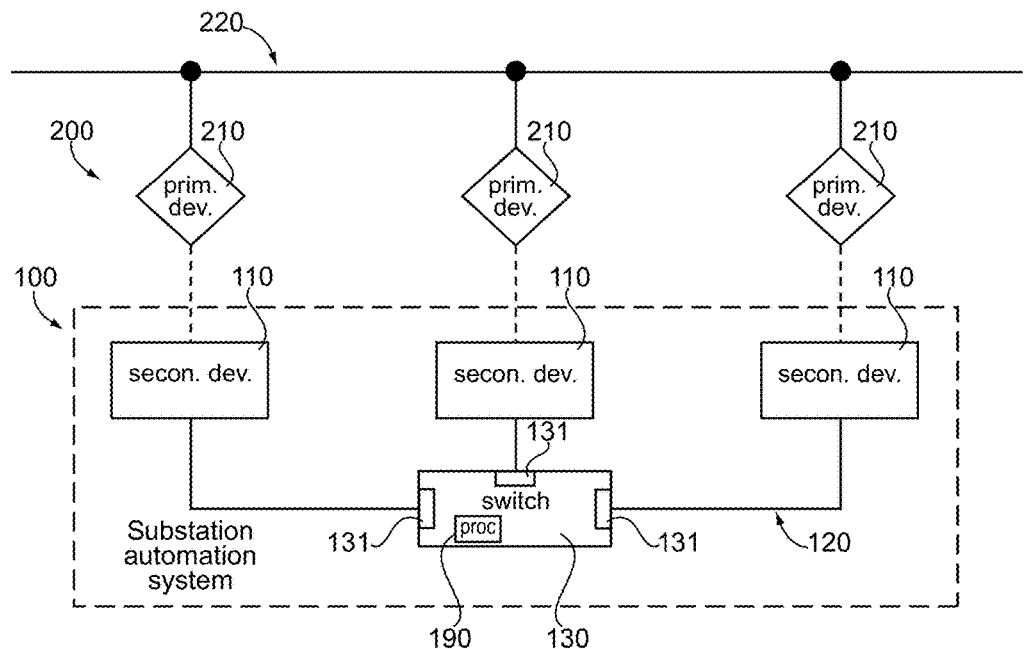
FIG. 2 schematically shows a substation automation system according to an exemplary embodiment of the present disclosure.

FIG. 2 schematically shows a substation automation system according to an exemplary embodiment of the present disclosure. FIG. 2 shows a power distribution network, wherein the secondary devices 110 can be interconnected with a switch 130. The switch 130 includes a multitude of output ports 131, wherein one secondary device 110 is plugged with one output port, respectively.

The switch further includes a processor 190, whereas the processor carries out network management functions of the switch, for example a packet filtering process, wherein multicast packets, which are not to be forwarded to a given secondary device, can be rejected when leaving the output port 131 to the secondary device, e.g., the rejected multicast packet will not leave the switch and will not arrive at the secondary device.

The packet filter of the switch can be set up by a rule-defining secondary device or by a management secondary device as well as manually during the runtime of the substation automation system. These configuration mechanisms apply as well to a packet filter implemented on a secondary device.

Figure 3:
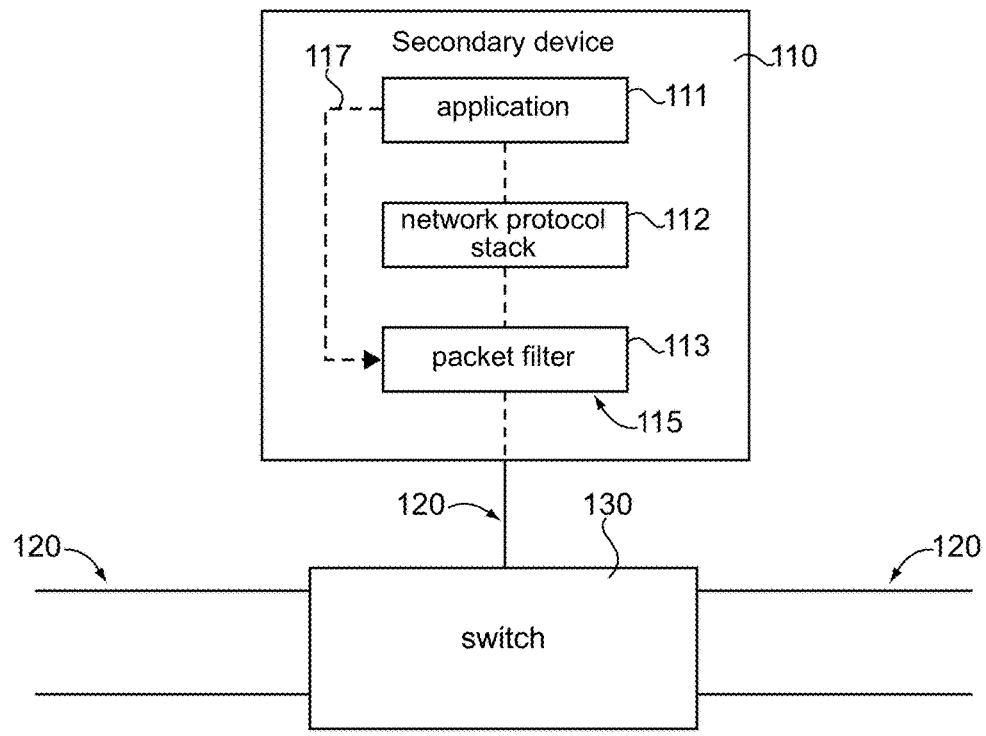
FIG. 3 schematically shows a secondary device for a substation automation system according to an exemplary embodiment of the present disclosure.

FIG. 3 schematically shows a secondary device for a substation automation system according to an exemplary embodiment of the present disclosure. FIG. 3 schematically shows an architectural overview of a secondary device 110 with an application 111 running on a processor of the secondary device 110, a network protocol stack 112 and a packet filter 113, wherein the packet filter 113 is implemented as an FPGA 115.

The secondary device 110 is connected to a switch 130, which can be connected to a multitude of further secondary devices via the station bus system 120.

The application 111 is adapted to set up rules in the packet filter 113. This setting up process of the rules is indicated by the arrow 117. The packet filter 113 forwards packets via the protocol stack 112 to the application 111, whereas the application defines the rules of the packet filter, which rules directly affect the received and forwarded packets, e.g., which rules can be a decision basis for forwarding received packets to the application or rejecting these packets.

Figure 4:
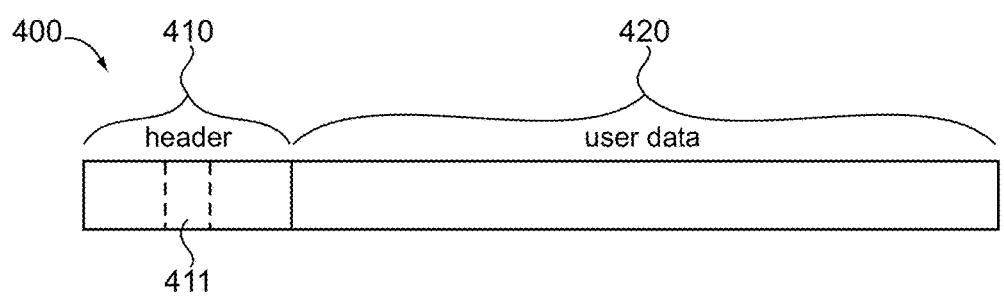
FIG. 4 schematically shows a multicast packet of a secondary device according to an exemplary embodiment of the present disclosure.

FIG. 4 schematically shows a multicast packet of a secondary device according to an exemplary embodiment of the present disclosure. As shown in FIG. 4, the packet 400 includes a header 410 and user data 420, wherein the header 410 includes an identification field 411 of the multicast packet type or multicast stream, in order to determine, which of the secondary devices a respective multicast packet pertains to.

Figure 5:
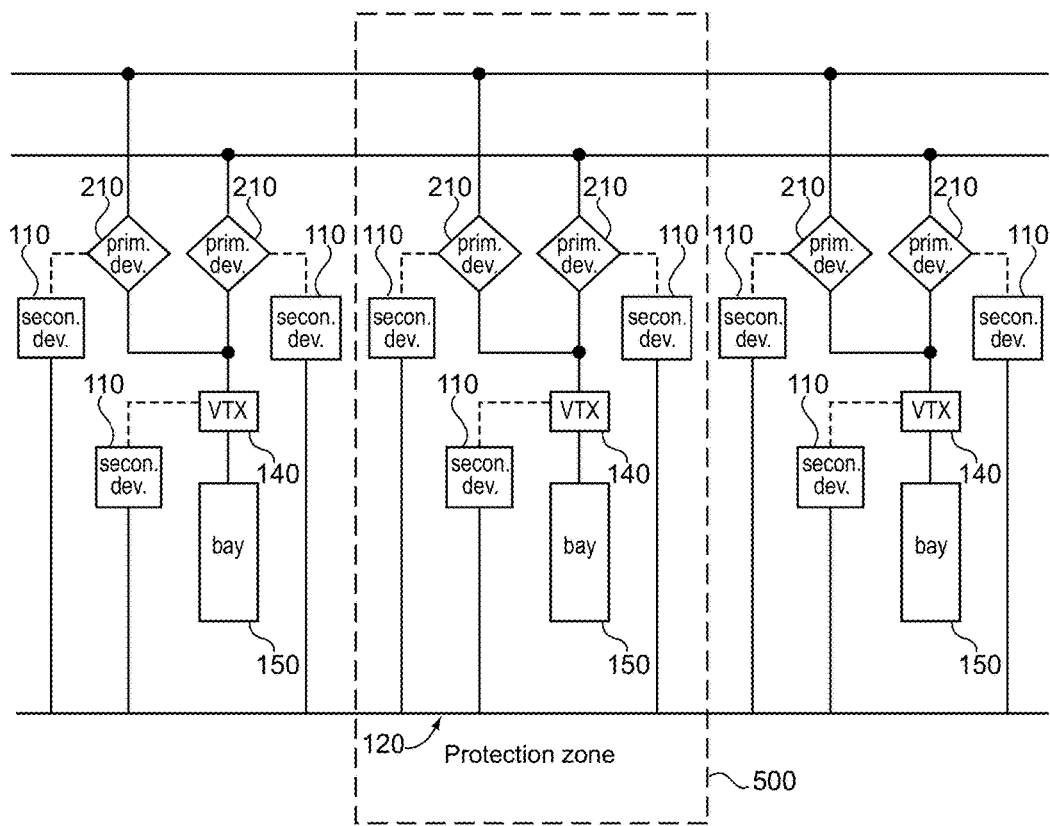
FIG. 5 schematically shows a protection zone of a substation automation system according to an exemplary embodiment of the present disclosure.

FIG. 5 schematically shows a protection zone of a substation automation system according to an exemplary embodiment of the present disclosure. Namely, FIG. 5 shows a substation automation system for operating a high or medium voltage substation.

The substation is segmented into protection zones 500, wherein each protection zone includes a multitude of primary devices 210 and secondary devices 110. A bay 150, e.g., a load or a generator, is connected via a voltage transformer 140 to the primary devices 210, wherein an IED 110 is adapted to control the voltage transformer 140, which connects the bay 150 to the primary devices.

The packet filters of the secondary devices 110 can be adapted such that all secondary devices in one protection zone receive the same multicast streams.

The membership or belonging of a primary device and the corresponding secondary device to a protection zone can vary dynamically. Thus, an update of the packet filter of the secondary devices can be needed. The packet filters of the secondary devices of the issuing protection zone (e.g., the protection zone from which a secondary device is taken away) as well as of the receiving protection zone (e.g., the protection zone to which a secondary device is being transferred) can involve an update of the rules, in order not to send to the transferred secondary device multicast packets which are no longer relevant to it, and to send the new needed (e.g., specified) multicast packets from the receiving protection zone.

Figure 6:
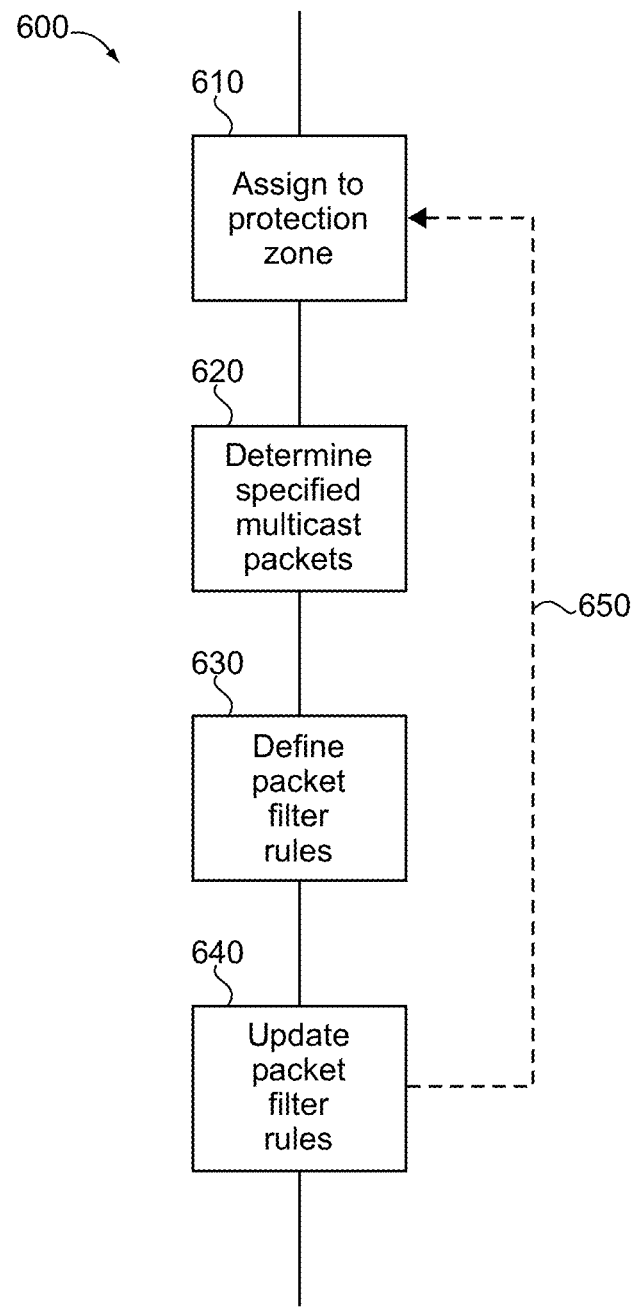
FIG. 6 schematically shows a method for setting up rules in a packet filter in a secondary device of a substation automation system according to an exemplary embodiment of the present disclosure.

FIG. 6 schematically shows a method 600 for setting up rules in a packet filter in a secondary device of a substation automation system according to an exemplary embodiment of the present disclosure.

In a step 610, the secondary devices and/or the multicast streams can be assigned to one of a plurality of protection zones.

In a subsequent step 620, multicast packets specified by an application running on the secondary device can be determined.

In the step 630, rules for the packet filter in terms of multicast identifiers (multicast addresses, VLAN IDs) can be defined in order to forward multicast packets received via the station bus system to the application, if the incoming multicast packets meet at least one rule of the packet filter.

In the step 640, the rules of the packet filter can be updated in case the multicast packets specified by the application running on the secondary device have changed.

The arrow 650 indicates that the method is carried out periodically or repeatedly, wherein the method starts performing the steps 610, 620, 630 again after the step 640 has been carried out.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS 100 substation automation system
110 secondary device
111 application
112 protocol stack
113 packet filter
115 FPGA
117 writing the rules of the packet filter by the application
120 station bus system
130 network interconnection device
131 output port
140 voltage transformer
150 load or generator
190 processor of a secondary device
195 computer readable medium
200 substation
210 primary device
220 bus bar segment
400 multicast packet
410 header of the multicast packet
411 identification field of the multicast packet 420 user data of the multicast packet
500 protection zone
600 method for setting up rules in the packet filter
610 assigning-step of the method (600)
620 determining-step of the method (600)
630 defining-step of the method (600)
640 updating-step of the method (600)
650 arrow representing the repeated running of the method (600)

What is claimed is:

1. A substation automation system for operating a high or medium voltage substation of an electric power transmission or distribution network, the substation automation system comprising:
a bus system and a multitude of secondary devices;
wherein each of the multitude of secondary devices
is adapted to at least one of send and receive multicast messages via the bus system,
includes a processor adapted to execute an application stored in a non-transitory memory to operate a primary device of the substation automation system,
includes a packet filter integrated circuit adapted to select multicast messages, based on a rule of the packet filter integrated circuit, and to forward the selected multicast messages from the bus system towards the application executed by the processor;
wherein the processor is adapted to execute rule adaptor instructions to dynamically adapt the rule of the packet filter integrated circuit during runtime of the substation automation system in case of a change in multicast packet needs of the application, the rule adaptor instructions being adapted to determine an identifier used by the rule of the packet filter integrated circuit to identify and forward the selected multicast messages, the identifier being determined from a Substation Configuration Description (SCD) of the substation automation system; and
wherein the adaptation of the rule of the packet filter integrated circuit during runtime of the substation automation system is effective to identify and forward the selected multicast messages which are currently needed by the application executed by the processor;
wherein the adaptation of the rule of the packet filter integrated circuit during runtime of the substation automation system is effective to reduce the processing load imposed on the processor by limiting the identification and the forwarding to only the selected multicast messages which are currently needed by the application executed by the processor;
wherein a secondary device, which sends a multicast packet, is adapted to write an identifier in a header field of the multicast packet, and wherein the rule of the packet filter integrated circuit involves said identifier.

2. The automation system of claim 1, wherein the packet filter integrated circuit comprises a field programmable gate array (FPGA).

3. The automation system of claim 1, wherein the rule of the packet filter integrated circuit is implemented at a hardware level of a protocol stack of the secondary device.

4. A method of adapting rules in a packet filter integrated circuit of a secondary device of a substation automation system for operating a high or medium voltage substation of an electric power transmission or distribution network, the substation automation system including a bus system and a multitude of secondary devices each adapted to at least one of send and receive multicast messages via the bus system, the method comprising:

executing, with a processor of a secondary device of the multitude of secondary devices, an application stored in a non-transitory memory to operate a primary device of the substation automation system;
selecting with a packet filter integrated circuit multicast messages received by said secondary device based on a rule of the packet filter integrated circuit;
forwarding with the packet filter integrated circuit the selected multicast messages from the bus system towards the application executed by the processor; and
executing with the processor a rule adaptor instruction to dynamically adapt the rule of the packet filter integrated circuit during runtime of the substation automation system in response to a change in multicast packet needs of the application, the rule adaptor instruction being adapted to determine an identifier used by the rule of the packet filter integrated circuit to identify and forward the selected multicast messages, the identifier being determined from a Substation Configuration Description (SCD) of the substation automation system;
wherein the adaptation of the rule of the packet filter integrated circuit during runtime of the substation automation system is effective to identify and forward the selected multicast messages which are currently needed by the application executed by the processor,
the adaptation of the rule of the packet filter integrated circuit during runtime of the substation automation system is effective to reduce the processing load imposed on the processor by limiting the identification and the forwarding to only the selected multicast messages which are currently needed by the application executed by the processor, and
the acts of selecting and forwarding with the packet filter integrated circuit are adapted to utilize an identifier in a header field of the selected multicast packet, and wherein the rule of the packet filter integrated circuit involves said identifier.

5. The method of claim 4 wherein the adaptation of the rule of the packet filter integrated circuit comprises adapting the rule in a field programmable gate array (FPGA).

6. The method of claim 4 wherein the rule of the packet filter integrated circuit is implemented at a hardware level of a protocol stack of the secondary device.

7. A non-transitory computer readable medium configured with instructions executable by a processor of a secondary device of a substation automation system for operating a high or medium voltage substation of an electric power transmission or distribution network, the instructions executable to perform a plurality of acts comprising:
executing an application on the processor to operate a primary device of the substation automation system;
executing a rule adaptor instruction on the processor to dynamically adapt a packet filter rule during runtime of the substation automation system in response to a change in multicast packet needs of the application, execution of the rule adaptor instruction providing an identifier indicating a current multicast packet need of the application, the identifier being determined from a Substation Configuration Description (SCD) of the substation automation system;
providing the adapted packet filter rule from the processor to a packet filter integrated circuit of the secondary device; and
receiving with the processor a multicast message selected by the packet filter integrated circuit based upon the adapted packet filter rule and forwarded by the packet filter integrated circuit from a bus system toward the application executed by the processor;

wherein the adaptation of the rule of the packet filter integrated circuit during runtime of the substation automation system is effective to identify and forward the selected multicast message which is currently needed by the application executed by the processor;

wherein the adaptation of the rule of the packet filter integrated circuit during runtime of the substation automation system is effective to reduce the processing load imposed on the processor by limiting the identification and the forwarding to only the selected multicast messages which are currently needed by the application executed by the processor;

wherein the adapted packet filter rule utilizes an identifier which is written into a header filed of the selected multicast message by a sending device which sends selected multicast message.

8. The non-transitory computer readable medium of claim 7 wherein the packet filter integrated circuit comprises a field programmable gate array (FPGA) and the rule adaptor instruction is configured to adapt the rule in the FPGA.

9. The non-transitory computer readable medium of claim 7 wherein the rule of the packet filter integrated circuit is implemented at a hardware level of a protocol stack of the secondary device.

* * * * *